United States Patent [19]
Naito et al.

[11] Patent Number: 5,493,495
[45] Date of Patent: Feb. 20, 1996

[54] APPARATUS FOR DETECTING OCCURRENCE OF FAILURE IN ANTI-SKID BRAKE CONTROL SYSTEM FOR MOTOR VEHICLE

[75] Inventors: Yasuo Naito; Katsumi Izawa; Masahiro Tado, all of Himeji, Japan

[73] Assignee: Mitsubishi Denki Kabushiki Kaisha, Tokto, Japan

[21] Appl. No.: 296,926

[22] Filed: Aug. 31, 1994

[30] Foreign Application Priority Data

Sep. 7, 1993 [JP] Japan .................. 5-222417

[51] Int. Cl.$^6$ .............. B60T 8/88; G06F 15/16
[52] U.S. Cl. .............. 364/426.02; 364/426.04; 303/122; 303/136
[58] Field of Search ............ 364/426.02, 426.03, 364/426.04, 424.03, 424.04, 551.01, 565, 571.07, 571.08; 303/92, 93, 94, 109; 180/197; 371/27, 67.1, 68.1

[56] References Cited

U.S. PATENT DOCUMENTS

| | | | |
|---|---|---|---|
| 3,706,971 | 12/1972 | Okamoto et al. | 340/453 |
| 4,338,667 | 7/1982 | Cook et al. | 364/426.02 |
| 4,493,210 | 1/1985 | Fries et al. | 303/92 |
| 4,745,542 | 5/1988 | Baba et al. | 364/426.02 |
| 4,773,072 | 9/1988 | Fennel | 371/68 |
| 4,805,104 | 2/1989 | Kishimoto et al. | 364/426.01 |
| 4,935,873 | 6/1990 | Ishizeki | 303/92 |
| 5,001,641 | 3/1991 | Makino | 303/93 |
| 5,074,626 | 12/1991 | Kramer et al. | 303/100 |
| 5,193,887 | 3/1993 | Bleckmann et al. | 303/92 |
| 5,265,944 | 11/1993 | Gloceri | 364/426.02 |

Primary Examiner—Kevin J. Teska
Assistant Examiner—Tan Q. Nguyen
Attorney, Agent, or Firm—Sughrue, Mion, Zinn, Macpeak & Seas

[57] ABSTRACT

A failure detecting apparatus for an anti-skid brake control system of a motor vehicle comprises a main microcomputer for generating a hydraulic pressure control signal for controlling an actuator adapted to generate braking efforts to be applied to wheels of the motor vehicle, an auxiliary microcomputer for detecting occurrence of a failure in the main microcomputer on the basis of the hydraulic pressure control signal, a test signal generating means implemented in the main microcomputer or the auxiliary microcomputer to generate a test signal, an anti-skid brake control arithmetic means incorporated in the main microcomputer to generate a hydraulic pressure control signal on the basis of either a wheel speed signal or the test signal, and a hydraulic pressure control signal monitoring means implemented in the auxiliary microcomputer to monitor the hydraulic pressure control signal generated in response to the test signal, to thereby check the validity of the hydraulic pressure control signal. An anti-skid brake control system equipped with a self-diagnosis function can be implemented inexpensively.

10 Claims, 12 Drawing Sheets

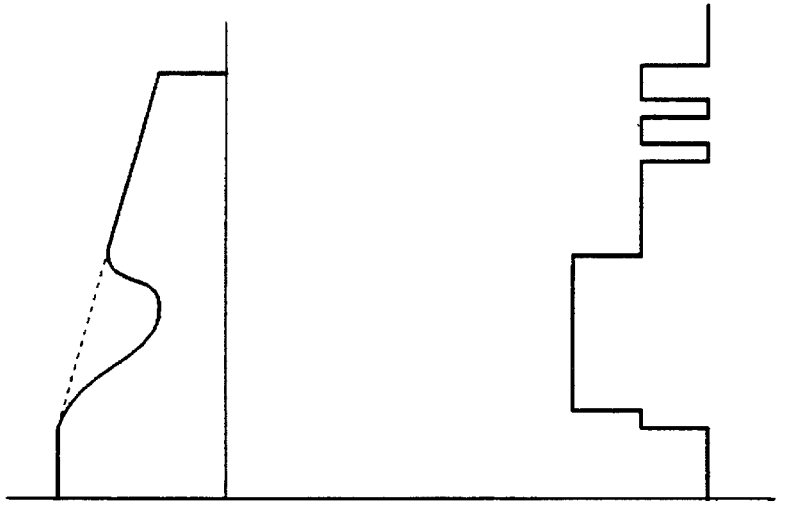
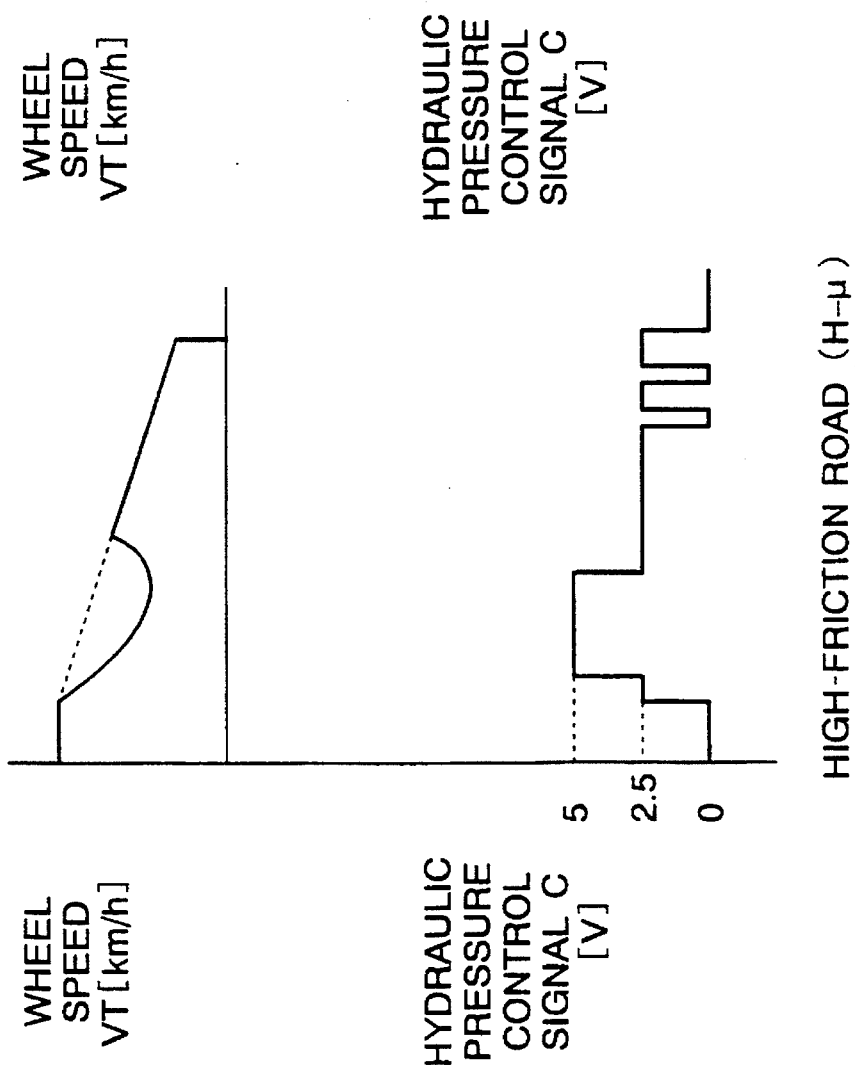

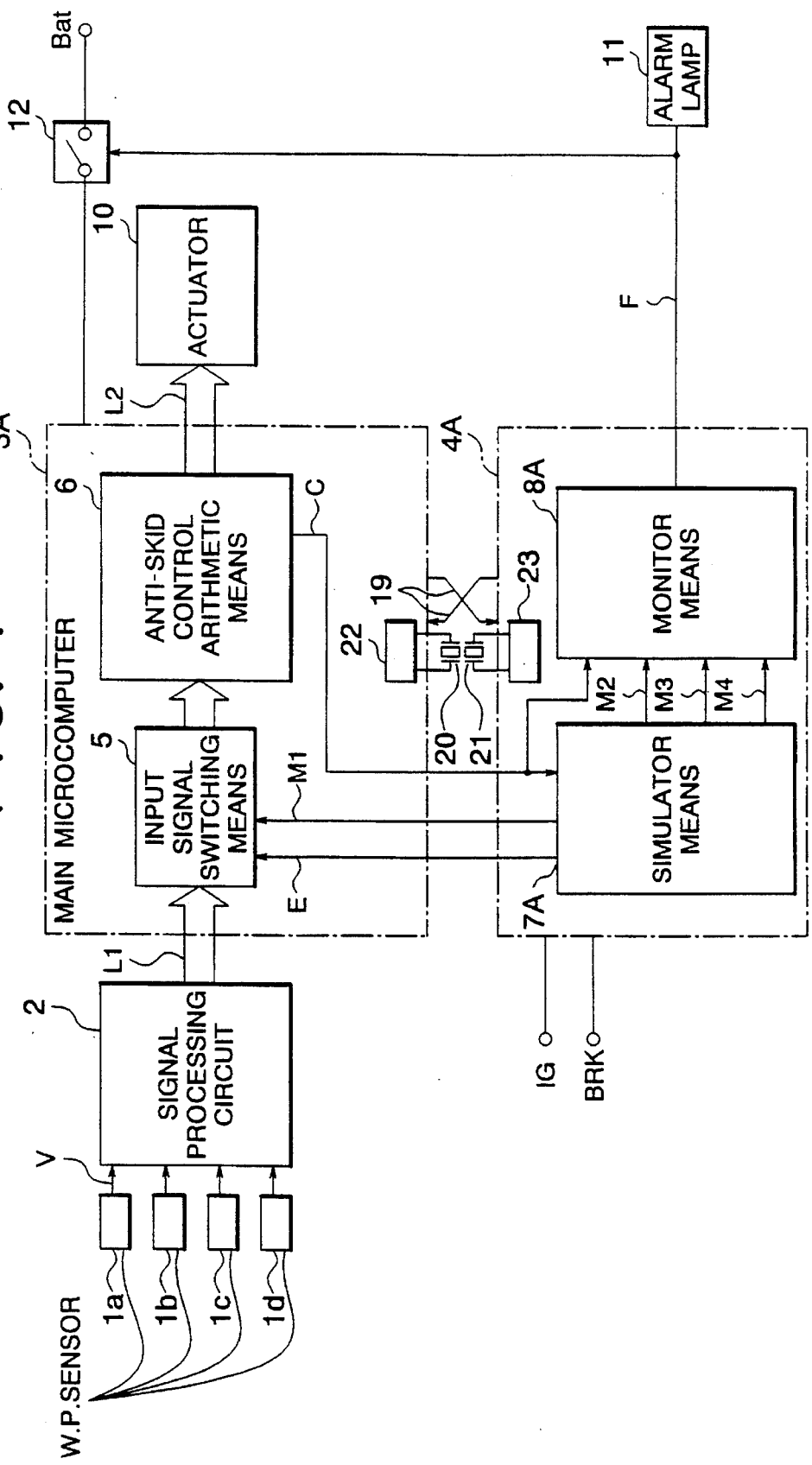

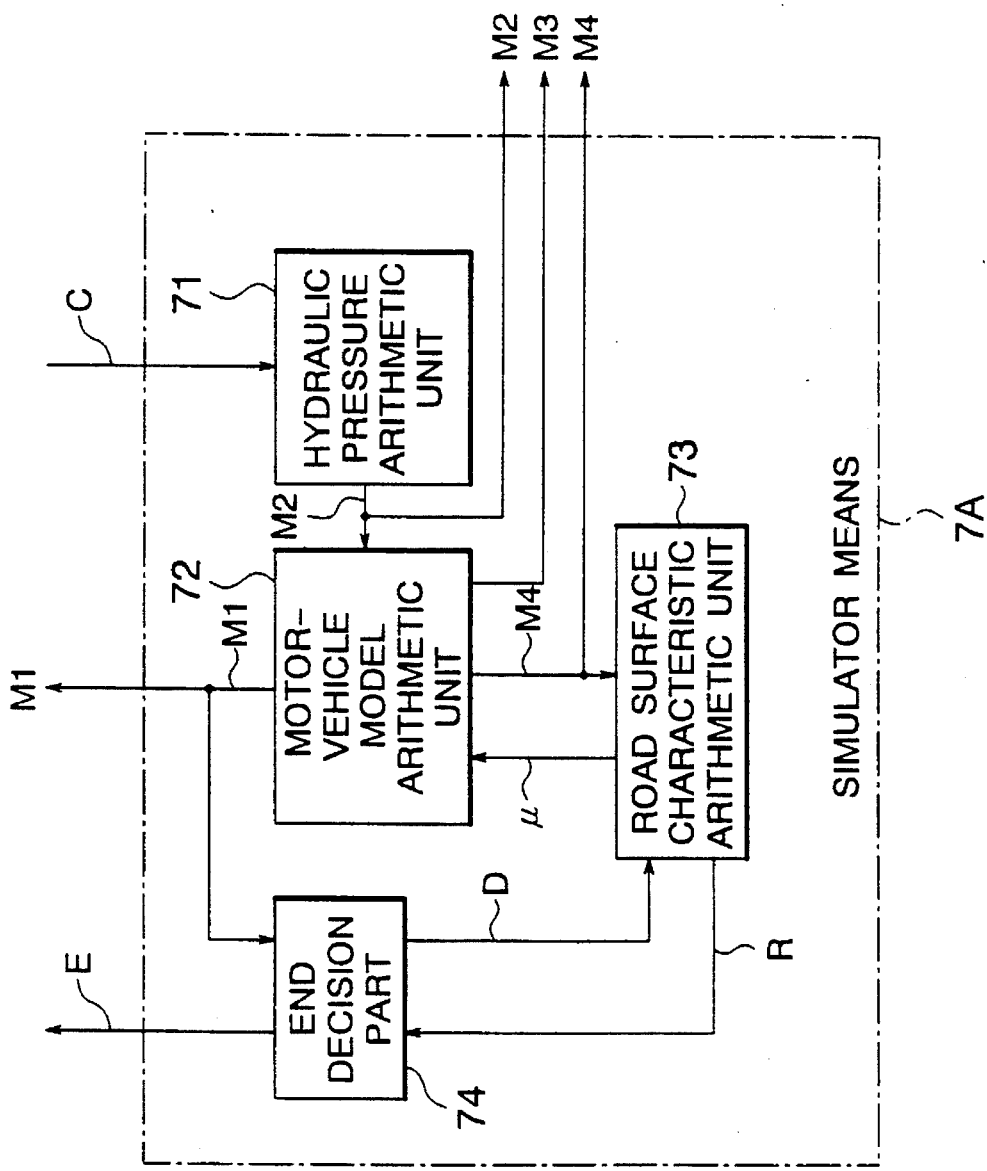

HIGH-FRICTION ROAD (H-μ)

LOW-FRICTION ROAD (L-μ)

APPARATUS FOR DETECTING OCCURRENCE OF FAILURE IN ANTI-SKID BRAKE CONTROL SYSTEM FOR MOTOR VEHICLE

BACKGROUND OF THE INVENTION

1. Field of the Invention

The present invention relates to a failure detecting apparatus for an anti-skid brake control system of an automobile or motor vehicle, which apparatus is designed for detecting occurrence of a failure or fault in an anti-skid brake control system (ABS) employed in the motor vehicle for the purpose of controlling the braking efforts applied to the wheels of the motor vehicle on the basis of wheel speed signals. More particularly, the invention is concerned with a failure detecting apparatus for ah anti-skid brake control system of a motor vehicle which apparatus can be implemented inexpensively while ensuring a high reliability by using in association with a main microcomputer an auxiliary microcomputer of lower performance as compared with that of the former.

2. Description of the Related Art

In the automobiles and motor vehicles, there has heretofore been employed a failure detecting apparatus for diagnosing an anti-skid (or anti-lock) brake control system which is designed for controlling the braking efforts applied to individual wheels of the motor vehicle on the basis of the wheel speed signals for optimizing the skid or slip thereof. A typical one of such failure detecting apparatuses is disclosed in, for example, Japanese Unexamined Patent Application Publication No. 267140/1986 (JP-A-61-267140).

For better understanding of the invention, the related background techniques will first be described in some detail. FIG. 11 is a block diagram showing schematically a structure of a failure detecting apparatus for an anti-skid brake control system of a motor vehicle which is described in the publication mentioned above. Referring to the figure, a wheel speed detection means generally denoted by a numeral 1 generates wheel speed signals V representing wheel rotation speeds each in terms of pulse frequency and is comprised of four wheel speed sensors 1a to 1d each implemented in the form of a transducer and provided in association with the individual wheels (not shown), respectively, of a motor vehicle (not shown either). The wheel speed signals V outputted from the wheel speed sensors 1a to 1d are supplied to a signal processing circuit 2 to undergo amplification as well as signal conditioning processing such as waveform shaping.

There are disposed in parallel a pair of microcomputers 3a and 3b, wherein the wheel speed signals V outputted from the signal processing circuit 2 are supplied to the microcomputers 3a and 3b via a multiple-line bus L1. The microcomputers 3a and 3b are constituted by circuit systems implemented in the form of program-controlled circuits or microprocessors of a same structure or configuration for processing the wheel speed signals V with a redundancy in order to ensure a fail-safe operation of the anti-skid brake control system. In other words, the wheel speed signals V are processed simultaneously by both of the microcomputers 3a and 3b. At this juncture, it should however be mentioned that one of the microcomputers 3a and 3b (e.g. the microcomputer 3a) serves as a main microcomputer for controlling the anti-skid brake system while the other (3b) is destined to serve for a failure monitoring function which will be described later on. Signal buses L2 and L3 are led out from output ports of the microcomputers 3a and 3b, while signal buses L4 and L5 are led out from logic blocks (described below) incorporated in the microcomputers 3a and 3b, respectively.

More specifically, the microcomputers 3a and 3b include the logic blocks 6a and 6b which fetch the wheel speed signals V via the signal bus L1, comparators 9a and 9b for comparing the signals on the signal buses L4 and L5 with the signals on the output ports L2 and L3, respectively, and clock oscillators 22 and 23, respectively.

The microcomputers 3a and 3b are connected to each other via synchronizing signal lines 19. Crystal elements 20 and 21 cooperate with the clock oscillators 22 and 23 to constitute synchronizing means for establishing synchronism in operations of both the microcomputers 3a and 3b.

The microcomputer 3a is supplied with an electric power from a power source. Bat via a main switch 12.

An amplifier circuit serving as a valve driver 13 is connected to the output port L2 of the microcomputer 3a for electrically driving a multi-way hydraulic valve 10a which constitutes a plurality of hydraulic actuators for a brake system. The multi-way hydraulic valve 10a has a plurality of outlet ports connected to, for example, brake pipes (not shown) disposed between a master cylinder of the motor vehicle and wheel brakes thereof, although not shown.

Thus, the multi-way hydraulic valve 10a operates in response to a hydraulic pressure control signal supplied from the microcomputer 3a via the signal bus L2 and the valve driver 13 to thereby control the braking efforts to be optimal so that the slip of each wheel can be maintained optimal. The degree of the slip is arithmetically determined by the microcomputers 3a and 3b on the basis of the wheel speed signal V. The control of the slip can be effectuated by increasing, decreasing or holding constant the brake pipe pressure.

A feedback circuit 14 is provided for feeding back the output signal of the microcomputer 3a via the valve driver 13 to the comparator 9b incorporated in the microcomputer 3b. Further provided are count/evaluation circuits 15a and 15b which serve to count the output signal pulses of the comparators 9a and 9b, respectively, for evaluation thereof. Output signals of the count/evaluation circuits 15a and 15b are monitored by monitor circuits 16a and 16b, respectively, which are also in charge of controlling the main switch 12 in accordance with the result of the monitoring.

When the output from either one of the monitor circuits 16a and 16b indicates occurrence of a failure in the microcomputer 3a or 3b, the main switch 12 is instantaneously opened to thereby interrupt the electric power supplied to the microcomputer 3a from the power source Bat, which of course results in that the anti-skid brake control system is set to the state where the anti-skid brake control does not work.

Next, description will now turn to operation of the prior art failure detecting apparatus for the anti-skid brake control system.

The wheel speed signals V outputted from the wheel speed sensor means S1 to S4 provided in association of the wheels of the motor vehicle, respectively, undergo amplification and shaping processing in the signal processing circuit 2 to be thereby converted into binary signals (i.e., data signals) which are then supplied to the microcomputers 3a and 3b via the multiple-line bus L1.

Thus, both of the microcomputers 3a and 3b process in parallel the wheel speed signals V which are in the form of binary signals. The results of the processings are delivered from the output ports L2 and L3, respectively. Thus, it can be said that the processing of the wheel speed signals V is carried out in duplicate or with a redundancy.

The output signal of the microcomputer 3a is transformed into a hydraulic pressure control signal through the valve driver 13 for driving the multi-way hydraulic valve 10a in a manner known per se, whereby the pressures in the brake pipes disposed between the master cylinder and the individual wheel brakes are controlled correspondingly.

In this manner, the multi-way hydraulic valve 10a operates in response to the hydraulic pressure control signal supplied from the microcomputer 3a to thereby optimize the braking efforts so that magnitude of the slip can be set at an optimal value. On the other hand, the slip is detected by the microcomputers 3a and 3b on the basis of the wheel speed signals V. Incidentally, the slip control can be effectuated by increasing, decreasing or holding constant the hydraulic brake pressure.

It is known that the multi-way hydraulic valve 10a is employed in such an arrangement that a pressure increasing valve (booster valve) and a pressure decreasing valve (release valve) are provided for each of the wheels, i.e., for each of the control circuits including the microcomputer 3a.

The operation cycles of the microcomputers 3a and 3b are determined through cooperation of the clock oscillators 22 and 23 and the crystal elements 20 and 21. By way of example, the microcomputers 3a and 3b operate at 10 MHz and are synchronized with each other via the synchronization path 19.

Further, the microcomputers 3a and 3b transfer the wheel speed signals V and the hydraulic pressure control signal for the multi-way hydraulic valve 10a (the pressure increasing signal, pressure hold signal, the pressure decreasing signal and the like) with each other via the signal buses L4 and L5. At the same time, these signals are supplied to the comparators 9a and 9b incorporated in the parallel circuit systems, respectively.

Besides, the hydraulic pressure control signal issued from the microcomputer 3a is transferred to the comparator 9b incorporated in the microcomputer 3b via the valve driver 13 and the feedback circuit 14, while the hydraulic pressure control signal issued from the microcomputer 3b is supplied to the comparator 9a incorporated in the microcomputer 3a. With this arrangement, it is checked whether coincidence exists between the signal generated internally of the microcomputers 3a and 3b and the hydraulic pressure control signals as led outwardly.

The output signals of the comparators 9a and 9b are supplied to the monitor circuits 16a and 16b via the count/ evaluation circuits 15a and 15b, respectively. In that case, when either one of the monitor circuits 16a and 16b responds to the input signal (i.e., when occurrence of failure is decided), the main switch 12 is opened to thereby interrupt the power supply to the microcomputer 3a from the power source Bat. Thus, the anti-skid brake control system shown in FIG. 11 is changed over to the state where the system is inoperative.

As will now be understood from the foregoing description, in the conventional anti-skid brake control system such as illustrated in FIG. 11, there are employed two microcomputers 3a and 3b for performing identical arithmetic operations involved in the control, wherein fault or failure is detected on the basis of the result of decision made as to whether the results of operations performed by both the microcomputers 3a and 3b coincide with each other. However, solely for the purpose of detecting occurrence of failure in the anti-skid brake control system (ABS) of the motor vehicle, it seems unnecessary to adopt such configuration that the same processing is performed in duplicate and in parallel, because the anti-skid brake control is simply shut down upon occurrence of failure, differing from a fail-safe redundancy system where the back-up function is required upon occurrence of failure, as can be seen in the case of a brake control system for an air plane.

Thus, the failure detecting apparatus for the anti-skid brake control system (ABS) known heretofore in which two microcomputers of a same performance are employed as a main microcomputer and an auxiliary microcomputer for performing processing and collating operations in parallel through same procedure suffers from a problem that implementation of the apparatus involves unnecessarily high expensiveness.

SUMMARY OF THE INVENTION

In the light of the state of the art described above, it is therefore an object of the present invention to provide a failure detecting apparatus for the anti-skid brake control system of a motor vehicle which can be implemented very inexpensively in a simplified structure while ensuring high reliability for operation.

In view of the above and other objects which will become more apparent as description proceeds, there is provided according to an aspect of the present invention an apparatus for detecting occurrence of a failure in an anti-skid brake control system of a motor vehicle, which apparatus comprises a main microcomputer for generating a hydraulic pressure control signal for controlling an actuator means adapted to generate braking efforts to be applied to wheels of the motor vehicle, and an auxiliary microcomputer for detecting occurrence of a failure in the main microcomputer on the basis of the hydraulic pressure control signal, wherein the main microcomputer includes a test signal generating means for generating a test signal and an anti-skid brake control arithmetic means for determining and generating a hydraulic pressure control signal on the basis of either a wheel speed signal or the test signal, while the auxiliary microcomputer includes a hydraulic pressure control signal monitoring means for monitoring the hydraulic pressure control signal generated on the basis of the test signal, and wherein the hydraulic pressure control signal monitoring means determines occurrence of a failure in the main microcomputer unless correspondence preset between the hydraulic pressure control signal and the test signal is detected, whereby a failure signal is generated by the hydraulic pressure control signal monitoring means.

With the above arrangement of the failure detecting apparatus for the anti-skid brake control system, the test signal which corresponds to a wheel speed pattern signal detected when a brake effort is applied to the motor vehicle as generated by the test signal generating means is supplied to the anti-skid brake control arithmetic means, while the hydraulic pressure control signal monitoring means monitors the hydraulic pressure control signal generated by the anti-skid brake control arithmetic means in accordance with the test signal, to thereby check the validity of the hydraulic pressure control signal. This means that the auxiliary microcomputer which is destined only for making decision as to occurrence of a failure in the main microcomputer can be implemented by using a very inexpensive microcomputer or microprocessor whose structure and functions are much simplified and less expensive as compared with the main microcomputer, which in turn means that the failure detecting apparatus as a whole can be implemented or fabricated very inexpensively when compared with the conventional failure detecting apparatus where two microcomputers having the same functions are employed. To say in another way, there can be realized an anti-skid brake control system having a self-diagnosis function in a simplified structure at low manufacturing cost.

In a preferred mode for carrying out the invention, the test signal generating means may be so arranged as to generate the test signal when an ignition switch of the motor vehicle is closed with a brake switch thereof being opened and when the wheel speed signal is at zero level.

By virtue of the arrangement mentioned just above, the failure detecting apparatus for the anti-skid brake control system can be realized without impairing the anti-skid brake controllability.

In another mode for carrying out the invention, the test signal generating means may be implemented in the auxiliary microcomputer instead of incorporating it in the main microcomputer, substantially to the same effect. Further, the failure signal as generated by the hydraulic pressure control signal monitoring means may be utilized to interrupt power supply to the main microcomputer or the actuator while generating an alarm signal indicative of occurrence of failure in the main microprocessor or the anti-skid brake control system.

Further, according to yet another aspect of the invention, there is provided an apparatus for detecting occurrence of a failure in an anti-skid brake control system of a motor vehicle, which apparatus comprises a main microcomputer for generating a hydraulic pressure control signal for controlling an actuator means which is adapted to generate braking efforts to be applied to wheels of the motor vehicle, and an auxiliary microcomputer for detecting occurrence of a failure in the main microcomputer, wherein the main microcomputer includes a simulator means for generating in dependence on the hydraulic pressure control signal a variety of pseudo-signals for simulating the anti-skid brake control system as well as model type of the motor vehicle, the pseudo-signal including a pseudo-wheel signal, and anti-skid brake control arithmetic means for generating the hydraulic pressure control signal on the basis of either a wheel speed signal or the pseudo-wheel-speed signal, while the auxiliary microcomputer includes a monitor means for monitoring the hydraulic pressure control signal corresponding to the pseudo-wheel-speed signal or at least one of the pseudo-wheel-speed signals.

As a modification of the arrangement mentioned above, the simulator means may be implemented in the auxiliary microcomputer instead of incorporating it in the main microcomputer, substantially to the same effect.

The above other objects, features and attendant advantages of the present invention will more clearly be understood by reading the following description of the preferred embodiments thereof taken, only by way of example, in conjunction with the drawings.

BRIEF DESCRIPTION OF THE DRAWINGS

FIGS. 4A and 4B show waveform patterns of wheel speed signals generated on the basis of a test signal together with hydraulic pressure control signals;

FIG. 7 is a block diagram showing a circuit arrangement of an anti-skid brake control system equipped with a failure detecting apparatus according to the second embodiment of the invention;

FIG. 8 is a block diagram showing in detail a configuration of a simulator means incorporated in an auxiliary microcomputer of the system shown in FIG. 7;

DESCRIPTION OF THE PREFERRED EMBODIMENTS

In the following, the present invention will be described in detail in conjunction with preferred or exemplary embodiments thereof by reference to the drawings.

EMBODIMENT 1

Figure 1:
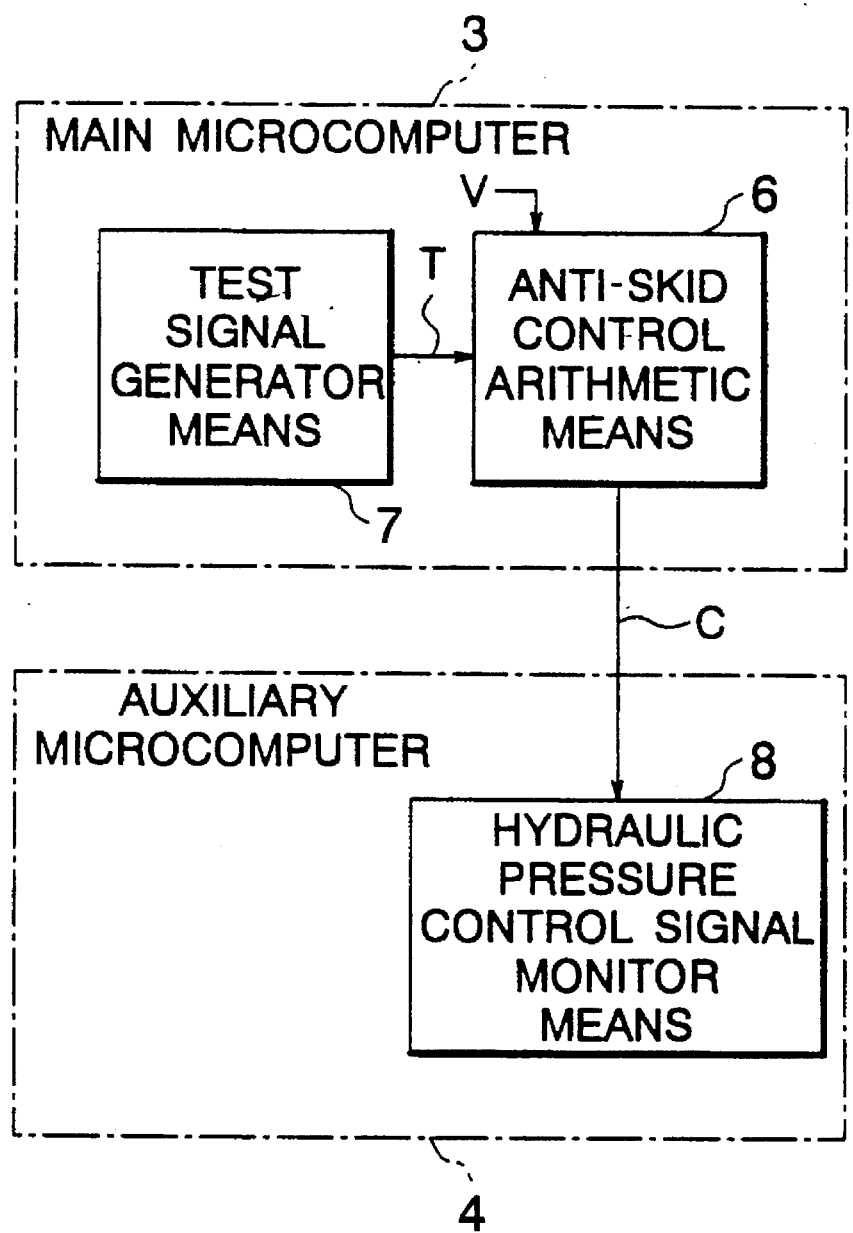
FIG. 1 is a schematic block diagram showing a major part of an anti-skid brake control system equipped with a failure detecting apparatus according to a first embodiment of the invention in which a test signal generating means is incorporated in a main microcomputer.
Figure 2:
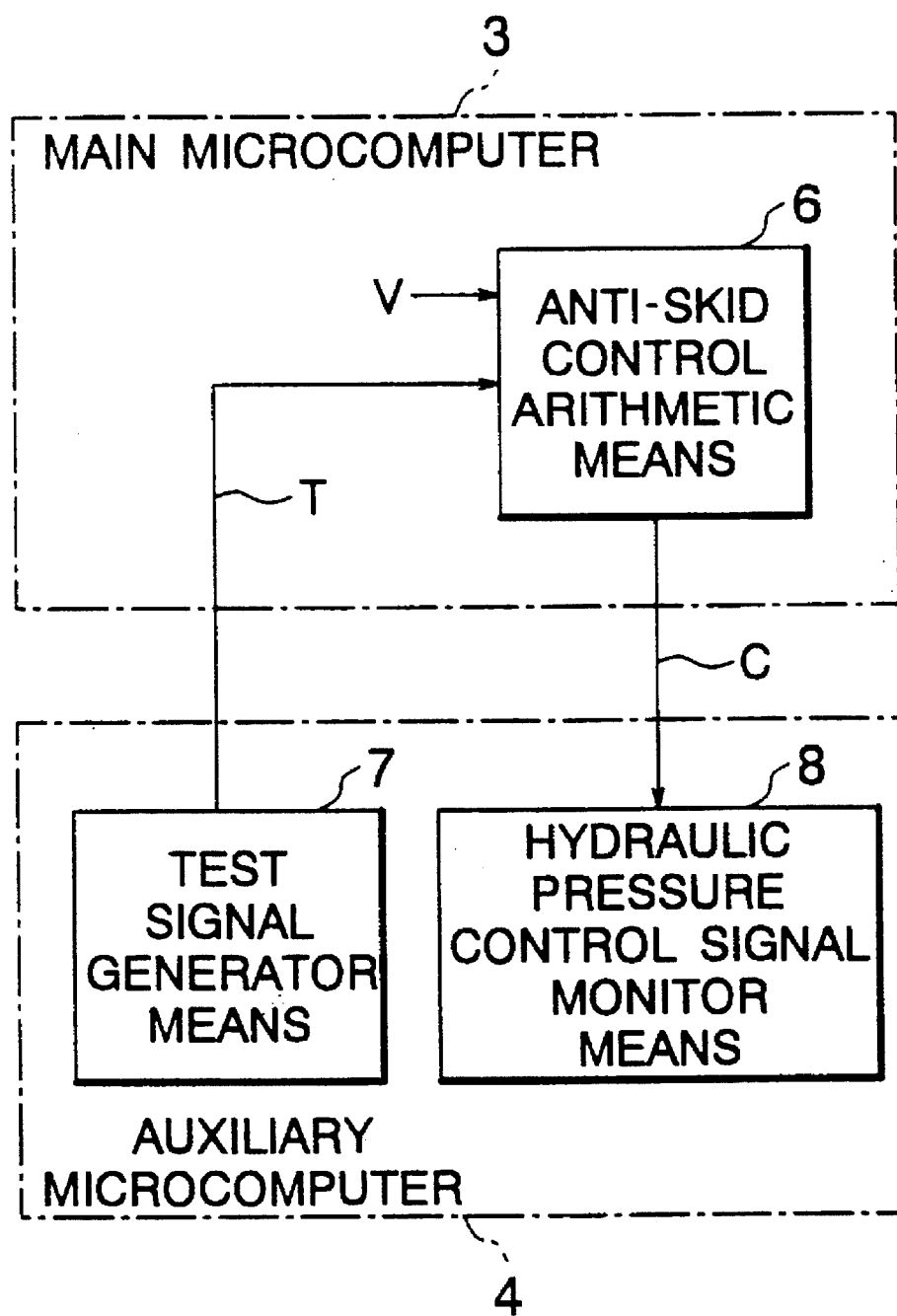
FIG. 2 shows in a similar diagram a modification of the system shown in FIG. 1 in which a test signal generating means is incorporated in an auxiliary microcomputer.

Now, a failure detecting apparatus for an anti-skid brake control system according to a first embodiment of the invention will be described by referring to FIGS. 1 and 2, wherein FIG. 1 is a schematic block diagram showing a major part of the same in which a test signal generating means is incorporated in a main microcomputer, and FIG. 2 shows in a similar diagram a structure in which the test signal generating means is incorporated in an auxiliary microcomputer.

More specifically, referring to FIGS. 1 and 2, the main microcomputer generates a hydraulic pressure control signal C for controlling an actuator (described hereinafter) which is designated to generate braking efforts to be applied to wheels of a motor vehicle. On the other hand, an auxiliary microcomputer 4 serves only for a function to detect occurrence of a failure or fault in the main microcomputer 3 by monitoring the hydraulic pressure control signal C. An anti-skid control signal arithmetic means 6 is incorporated in the main microcomputer 3 and serves for determining through arithmetic processing a hydraulic pressure control quantity and generating the signal C on the basis of wheel speed signals V or a test signal T. A test signal generating means 7 can be incorporated in either one of the main microcomputer 3 (FIG. 1) and the auxiliary microcomputer 4 (FIG. 2) for generating the test signal T. The auxiliary microcomputer 4 further incorporates a hydraulic pressure control signal monitoring means 8 for monitoring the hydraulic pressure control signal C generated in response to the test signal T.

The main microcomputer 3 is implemented in the form of a program-controlled circuit typified by a microprocessor, while the auxiliary microcomputer 4 is constituted by a microprocessor having lower performance when compared with that of the main microcomputer 3. As will be described hereinafter, the auxiliary microcomputer 4 is destined for detecting occurrence of a failure event in the main microcomputer 3. Accordingly, the auxiliary microcomputer 4 may be simpler in respect to the structure as well as performance when compared with the main microcomputer 3.

The test signal T generated by the test signal generating means 7 indicates a wheel speed pattern at the time the braking is applied to the motor vehicle. The test signal T is supplied to the anti-skid brake control arithmetic means 6 built in the main microcomputer 3. The hydraulic pressure control signal C generated on the basis of the test signal T is monitored by the hydraulic pressure control signal monitoring means 8 to be thereby checked as to the validity thereof.

Figure 3:
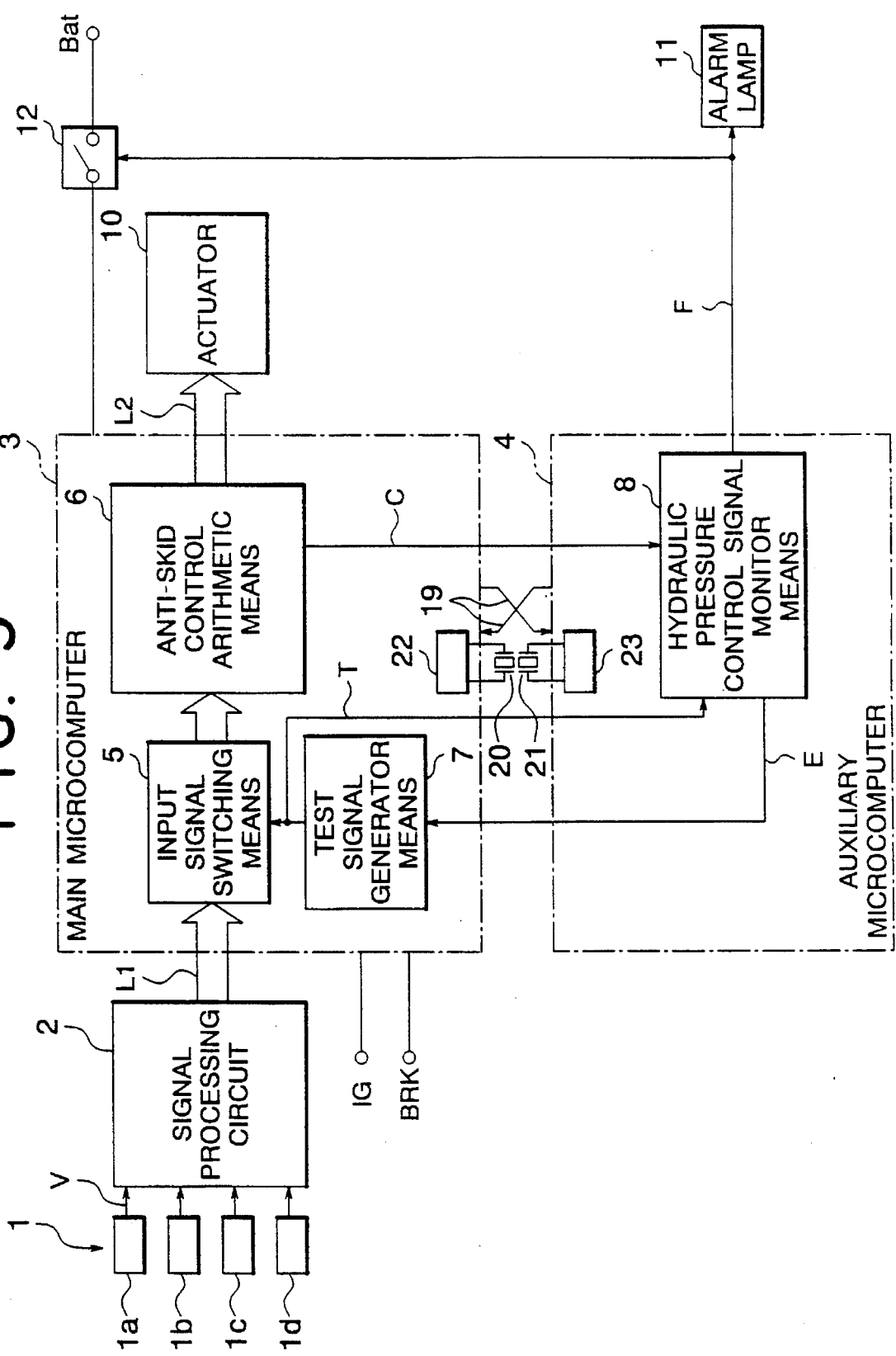
FIG. 3 is a block diagram showing in more detail a structure of an anti-skid brake control system equipped with a failure detecting apparatus according to the first embodiment of the invention.

FIG. 3 is a block diagram showing an anti-skid brake control system according to the instant embodiment of the invention in which the concept illustrated in FIG. 1 is incarnated In the figure, reference symbols 1, 2, L1, L2, 12, Bat and 19 to 23 denote the elements which are same as or equivalent to those mentioned hereinbefore by reference to FIG. 1. Accordingly, repeated description of these elements will be unnecessary. The functions of the main microcomputer 3 correspond to those of the microcomputer 3a.

The actuator 10 is driven by the hydraulic pressure control signal C supplied from the output port L2 and corresponds to the multi-way hydraulic valve 10a mentioned previously.

More specifically, the actuator 10 is so arranged as to control the braking efforts applied to the wheels of the motor vehicle in dependence on the wheel speed signals V. To this end, the actuator 10 may be constituted by a plurality of electromagnetically controlled valves, wherein a set of a pressure increasing valve and a pressure decreasing valves is provided in association with each of the wheels.

An input signal change-over means 5 is provided for switching the signals inputted to the anti-skid brake control arithmetic means 6. More specifically, the input signal change-over means 5 selects either one of the wheel speed signals V supplied from the signal processing circuit 2 via the signal bus L1 or the test signal T supplied from -the test signal generating means 7, the selected signal being inputted to the anti-skid brake control arithmetic means 6. Thus, the anti-skid brake control arithmetic means 6 performs arithmetic operation on the wheel speed signals V or the test signal T to thereby generate the hydraulic pressure control signal C for the actuator 10.

Further provided is an alarm lamp 11 which is electrically energized in response to a failure signal F generated by the hydraulic pressure control signal monitoring means 8. Besides, when the fail signal F is generated, the main switch 12 is opened, whereby the power supply from the power source Bat to the main microcomputer 3 is interrupted.

At this juncture, it should be mentioned that the input signal change-over means 5, the anti-skid brake control arithmetic means 6 and the test signal generating means 7 are implemented in the program-controlled main microcomputer 3, while the hydraulic pressure control signal monitoring means 8 is implemented in the auxiliary microcomputer 4.

An ignition switch signal and a brake switch signal of the motor vehicle are inputted to the main microcomputer 3 via respective input terminals IG and BRK.

It should however be noted that the test signal generating means 7 may alternatively be implemented internally of the auxiliary microcomputer 4, as can be seen in FIG. 2. Further, it should be added that instead of opening the main switch 12 via which the power is supplied to the main microcomputer 3 from the power source Bat, a main switch for interrupting power supply to the actuator 10 from the power source Bat in response to the failure signal F may be employed.

Next, referring to FIGS. 4A and 4B which show waveform patterns of the wheel speed VT generated on the basis of the test signal T, operation of the anti-skid brake control system according to the instant embodiment of the invention will be described in detail.

As mentioned hereinbefore, the wheel speed signals V detected by the wheel speed sensors 1a to 1d provided in association with the individual wheels of the motor vehicle are converted into corresponding binary signals by the signal processing circuit 2 to be supplied to the main microcomputer 3 in parallel via the signal bus L1.

The main microcomputer 3 processes the wheel speed signal V resulting from the above processing and selected through the input signal change-over means 5 to thereby allow the anti-skid brake control arithmetic means 6 to generate the hydraulic pressure control signal C which is then supplied from the output port L2 to the actuator 10 for actuation thereof.

As a result, the braking efforts applied to the individual wheels via the actuator 10 are optimized, whereby the slips can be controlled optimally. In that case, the slip control based on the output of the anti-skid brake control arithmetic means 6 is effectuated either by holding the brake pressure to be constant, decreasing the brake pressure or by increasing the brake pressure.

Further, the operation cycles of the main microcomputer 3 and the auxiliary microcomputer 4 are determined through cooperation of the clock oscillators 22 and 23 with the crystal elements 20 and 21, respectively. By way of example, the microcomputers 3 and 4 operate at a frequency of e.g. 10 MHz in synchronism with each other via the synchronization path 19.

It should be noted that the state where the brake system is actuated in the manner, as mentioned above, generation of the test signal T is inhibited, and thus the failure detection processing is not performed.

It is now assumed that the conditions for generation of the test signal T are satisfied. By way of example, it is assumed that the ignition switch is closed with the main switch 12 being in the on-state while the brake switch is opened, indicating that no brake efforts are applied, and that the wheel speed signal V is at zero level (indicating the stationary or rest state of the motor vehicle). In that case, the test signal generating means 7 generates one or more patterns of the wheel speed VT as the test signal T for a predetermined period, as is illustrated in FIGS. 4A and 4B.

Simultaneously with the generation of the pattern(s) of the wheel speed VT for the test, the test signal T is selected as the input signal to the anti-skid brake control arithmetic means 6 by the input signal change-over means 5.

In response, the anti-skid brake control arithmetic means 6 implemented in the main microcomputer 3 determines the hydraulic pressure control signal C in conformance to the wheel speed VT indicated by the test signal T to thereby output the hydraulic pressure control signal C periodically at a predetermined interval. On the other hand, the hydraulic pressure control signal monitoring means 8 implemented in the auxiliary microcomputer 4 monitors the hydraulic pressure control signal C conforming to the wheel speed VT indicated by the test signal T and compares the hydraulic pressure control signal C with a predetermined value determined previously on the basis of the test signal T and stored in the memory incorporated in the auxiliary microcomputer 4 to thereby check the validity of the hydraulic pressure control signal C. When the comparison mentioned above results in incoincidence between the hydraulic pressure control signal C and the predetermined value, it is then decided that a failure or fault occurs in the main microcomputer 3.

In FIG. 4A, the level of 0 (zero) volt of the hydraulic pressure control signal C supplied to the actuator 10 commands that the brake pressure is to be increased, the level of 2.5 volts indicates that the brake pressure be held constant and the level of 5 volts commands that the brake pressure be decreased.

At this juncture, it will be noted that in the case of the illustrated example, there are prepared two wheel speeds VT for the test i.e., for an H-μ road (corresponding to a road having a high friction coefficient μ) and a L-μ road (corresponding to a road having a low friction coefficient μ).

As can be seen in FIG. 4A, the wheel speed VT (km/h) of the motor vehicle running on the road of high friction coefficient (H-μ) responds quickly to change in the brake pressure. Accordingly, by decreasing the brake pressure for only a short duration, the wheel speed VT can be restored (increased) to coincide with the vehicle speed (indicated by a phantom line curve in FIG. 4A). In contrast, on the low friction road (L-μ), the wheel speed VT responds only slowly to a change in the brake pressure. Consequently, a lot of time is required for establishing coincidence between the wheel speed VT and the vehicle speed by decreasing the brake pressure, as is illustrated in phantom in FIG. 4B.

Thus, the wheel speed VT corresponding to the test signal T and the hydraulic pressure control signal C regulating to the brake pressure become so effective that the brake is automatically released by the anti-skid brake control system when the slip occurs between the road surface and the wheels of the motor vehicle upon application of steep braking (e.g. emergency braking), whereby the tendency of the slip to increase beyond a value determined previously as a function of the vehicle speed can be suppressed.

In response to the inputting of the test signal T, the anti-skid brake control arithmetic means 6 outputs initially the hydraulic pressure control signal C exhibiting a unique change as a function of time as illustrated in FIG. 4, wherein the hydraulic pressure control signal C is supplied to the actuator 10 or the hydraulic pressure control signal monitoring means 8.

In response to the detection of a failure in the main microcomputer 3, the hydraulic pressure control signal monitoring means 8 generates a failure signal F. In response to this failure signal, the alarm lamp 11 is lit, while the main switch 12 is opened to thereby interrupt the power supply to the main microcomputer 3 from the power source Bat. Alternatively, the power supply relay (not shown) for the actuator 10 may be opened. As a typical example of the failure, let's consider a failure in the arithmetic function or processing capability of the main microcomputer 3. In that case, when the hydraulic pressure control signal C which is arithmetically determined on the basis of the test signal T is deviated from a predetermined value, it can then be decided that a failure takes place in the main microcomputer 3.

As is apparent from the above description, according to the teachings of the invention incarnated in the instant embodiment, the wheel speed signals V available from the outputs of the wheel speed detection means 1 as processed or the test signals T generated by the test signal generating means 7 are sequentially processed by the main microcomputer 3 on a time-serial basis, wherein the hydraulic pressure control signal C outputted from the main microcomputer 3 is monitored time-serially by the auxiliary microcomputer 4.

Next, by reference to a flow chart of FIG. 5, operations of the anti-skid brake control system as well as the failure detecting apparatus therefor will be described in detail.

Figure 5:
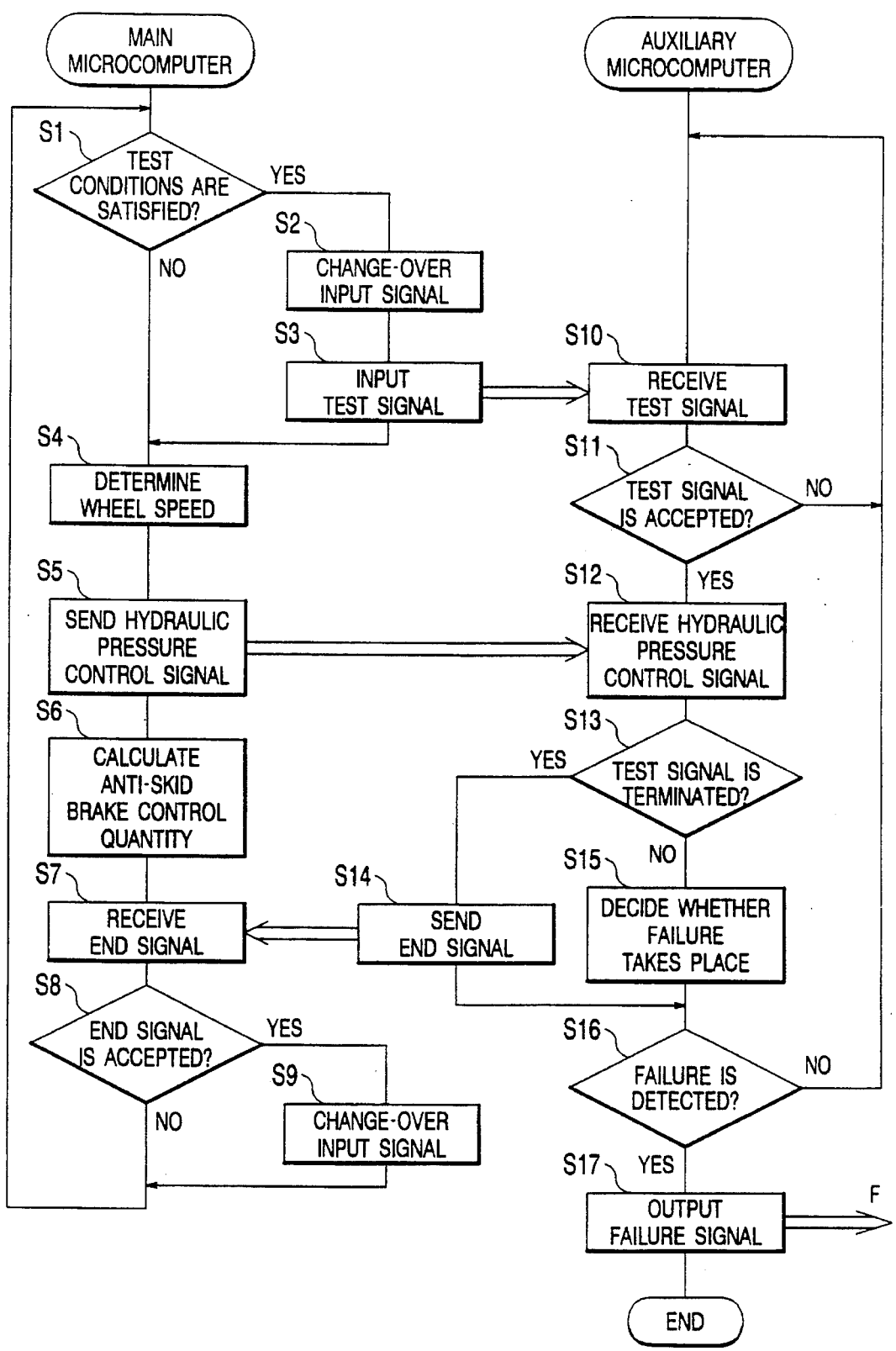
FIG. 5 is a flow chart for illustrating, by way of example, operations of a main microcomputer and an auxiliary microcomputer employed in the system shown in FIG. 3.

FIG. 5 is a flow chart for illustrating, by way of example, operations of the main microcomputer 3 and the auxiliary microcomputer 4 employed in the system according to the first embodiment of the invention in parallel, wherein routines including sequences of steps are periodically or cyclically executed by the main microcomputer 3 and the auxiliary microcomputer 4 at a predetermined interval.

At the start of the processing cycle, the main microcomputer 3 makes decision in a step S1 as to whether or not the conditions for the test (i.e., the conditions that the ignition switch is closed, the brake switch is opened and that the wheel speed signal is at zero level) are satisfied. When this decision step S1 results in affirmation (YES), the main microcomputer 3 selects the test signal T as the input signal in a step S2. Since the main microcomputer 3 is so designed as to arithmetically determine the hydraulic pressure control signal C on the basis of either the wheel speed signals V or the test signal T, the conditions for selecting the test signal T are to be satisfied. The conditions for enabling the selection of the test signal T are met, for example, when the brake key switch is opened and when the motor vehicle is stationary (i.e., when the vehicle speed is zero) with the ignition switch being on.

Subsequently, in a step S3, the test signal T is generated and sent to the auxiliary microcomputer 4, which is followed by execution of a step S4 where the conventional arithmetic operation for determining the wheel speed is performed. In a step S5, the hydraulic pressure control signal C corresponding to the wheel speed as determined is sent to the auxiliary microcomputer 4. On the other hand, unless the conditions for the test are satisfied in the step S1 (i.e., when the result of decision in the step S1 is "NO"), the processing proceeds to the step S4 without executing the steps S2 and S3.

In succession to the step S5 for sending the hydraulic pressure control signal C to the auxiliary microcomputer 4, an anti-skid brake control arithmetic operation is performed for determining the hydraulic pressure control quantity and generating the corresponding signal C which is to be employed in the instant cycle (step S6). At this time point, the hydraulic pressure control signal C resulting from the step S5 and to be sent to the auxiliary microcomputer is updated.

In a step S7, the main microcomputer 3 receives a test end signal E from the auxiliary microcomputer 4, whereupon reception of the test end signal E is checked in decision step S8. When the reception of the test end signal E is confirmed in the step S8 (i.e., when the answer of this decision step is "YES"), the processing proceeds to a step S9.

In the step S9, the input signal switching is effected, whereby the data derived from the output of the wheel speed detection means 1 (i.e., the wheel speed signal V) is selected as the input signal internally of the main microcomputer 3, and the initial step S1 of the routine or cycle is resumed.

By contrast, when it is decided in the decision step S8 that the test end signal E is not yet received, (i.e., when the step S3 results in "NO"), the processing makes return to the step S1 instantaneously without executing the step S9, whereupon the sequence of steps S1 to S9 is repeated.

On the other hand, upon starting of a routine to be carried out by the auxiliary microcomputer 4, the processing for receiving the test signal T from the main microcomputer 3 is performed in a step S10, which is then followed by a decision step S11 where it is checked whether or not the test signal T has been received. If so, the answer of the step S11 is affirmative (YES). Accordingly, the auxiliary microcomputer 4 accepts the hydraulic pressure control signal C from the main microcomputer 3 in a step S12.

Subsequently, in a decision step S13, it is decided whether the test signal T received in the step S10 is terminated. If so (i.e., when the answer of the step S13 is "YES"), the test end signal E indicating normal end of the test signal T is sent to the main microcomputer 3 in a step S14. Thereafter, the processing proceeds to a failure decision step S16.

On the other hand, when it is decided in the step S13 that the test signal T is not yet terminated (i.e., when the step S13 results in negation "NO"), decision as to occurrence of failure is performed by comparing the hydraulic pressure control signal C with the predetermined value mentioned hereinbefore (step S15), and it is confirmed in the step S16 whether or not a failure has taken place.

When the result of the decision step S16 is affirmative (YES), indicating detection of a failure event, the failure detection signal F is issued, whereby the alarm lamp 11 is lit with the main switch 12 being opened. The routine then comes to an end (step S17).

By contrast, when the result of the decision step S16 is negative (NO), indicating that no failure has been detected, the processing makes return to the step S10, whereupon a sequence of the steps S10 to S17 is executed repeatedly.

EMBODIMENT 2

In the case of the first embodiment described above, a pattern of pseudo-wheel-speed VT, so to say, is generated as the test signal T. To this end, various pseudo-signals may be generated by using a simulator means.

Description which follows is directed to a second embodiment of the invention in which a simulator means is employed.

Figure 6A:
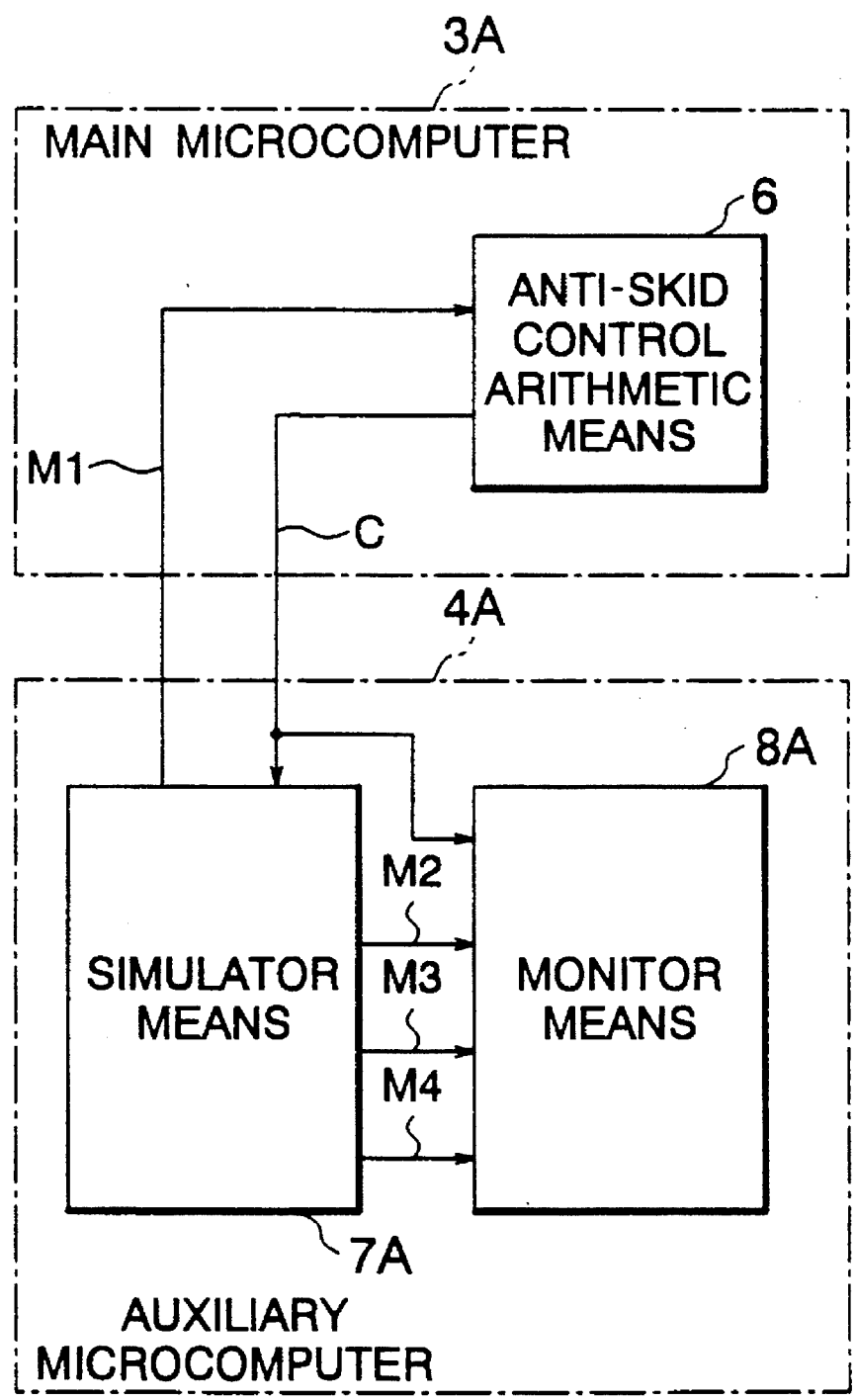
FIGS. 6A and 6B are schematic block diagrams illustrating the general concept underlying a second embodiment of the invention.
Figure 6B:
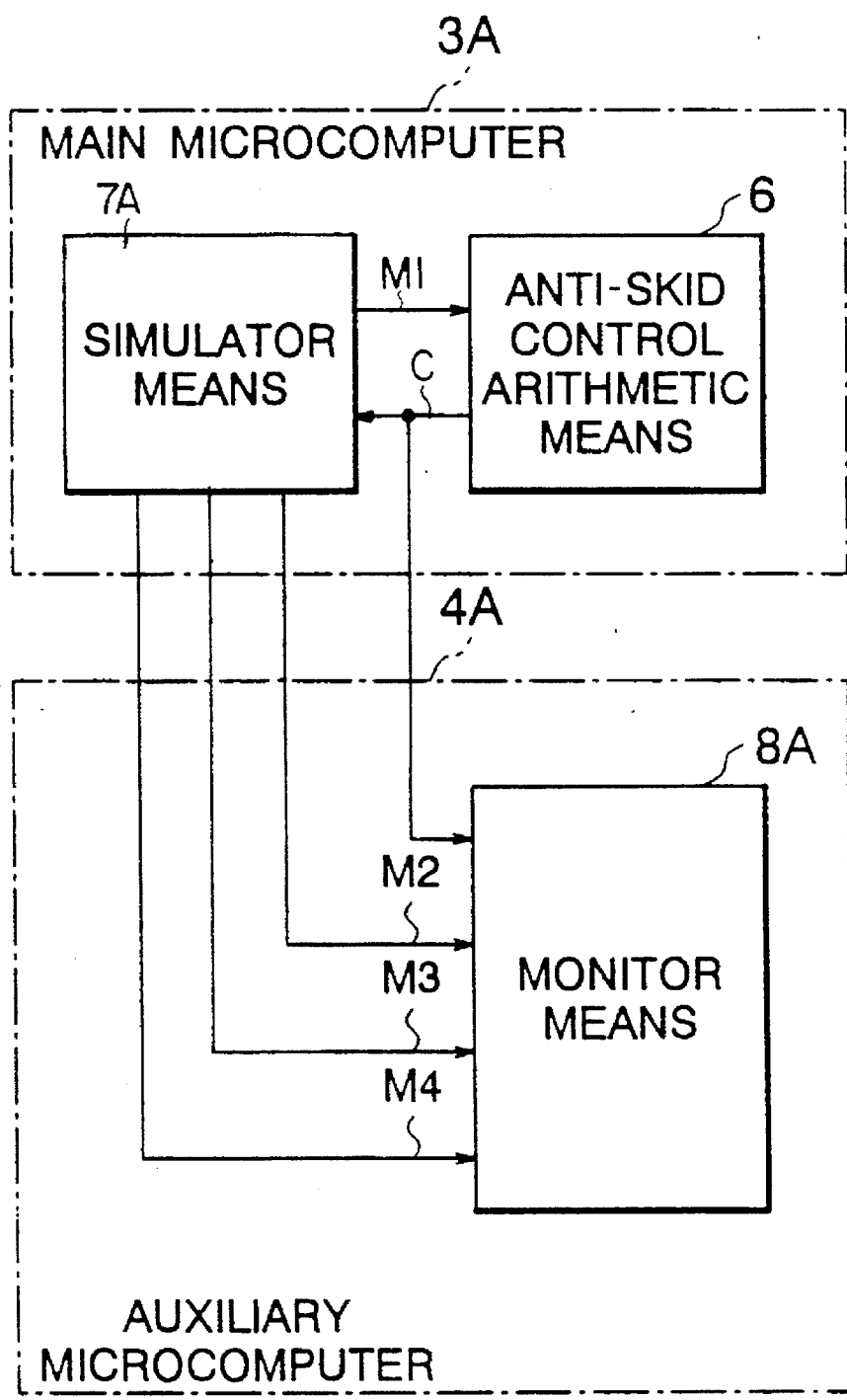

FIG. 6A is a schematic block diagram for illustrating the general concept underlying the second embodiment of the invention, and FIG. 7 is a block diagram showing a circuit arrangement of the anti-skid brake control system as well as the failure detecting apparatus according to the second embodiment. In these figures, reference symbols 1, 2, L1, L, 5, 6, 10 to 12, 19 to 23, E, C, F, Bat, IG and BRK denote the elements which are same as or equivalent to those described hereinbefore in conjunction with the prior art and the first embodiment of the invention. Accordingly, repeated description of these elements will be unnecessary. Parenthetically, microcomputers denoted by reference numerals 3A and 4A correspond to the main microcomputer 3 and the auxiliary microcomputer 4, respectively. Besides, simulator means 7A and monitor means 8A functionally correspond to the test signal generating means 7 and the hydraulic pressure control signal monitoring means 8, respectively.

The simulator means 7A provided for simulating the anti-skid brake control system as well as a motor-vehicle model is incorporated in, for example, the auxiliary microcomputer 4A and so designed as to determine and generate sequentially a pseudo-wheel-speed signal M1, a pseudo-brake-pressure signal M2, a pseudo-vehicle-deceleration signal M3 and a pseudo-slip-ratio signal M4 in response to reception of the hydraulic pressure control signal C when the previously mentioned conditions for generating the test signal T are satisfied. Thus, each of these various pseudo-signals M1 to M4 reflects the result of periodical operation of the anti-skid brake control arithmetic means 6 for determining the hydraulic pressure control signal C.

In the case of the instant embodiment, the signals applied to the ignition switch signal input terminal IG and the brake switch signal input terminal BRK from the ignition switch and the brake switch, respectively, are sent to the auxiliary microcomputer 4A to be utilized in the processing for deciding whether or not the conditions for generating the test signal T are met.

Incidentally, the simulator means 7A may be incorporated in the main microcomputer 3A as with the case of the test signal generating means 7 mentioned hereinbefore.

The monitor means 8A is built in the auxiliary microcomputer 4A for the purpose of monitoring the hydraulic pressure control signal C and at least one of the pseudo-wheel-speed signal M1, the pseudo-brake-pressure signal M2, the pseudo-vehicle-deceleration signal M3 and the pseudo-slip ratio signal M4 generated by the simulator means 7A in conformance with the pseudo-wheel-speed signal M1.

The monitor means 8A checks validity of the signals mentioned above. Upon detection of a failure event in the main microcomputer 3A, the monitor means 8A issues the failure signal F to open the main switch 12 for thereby interrupting the power supply to the main microcomputer 3A from the power source Bat. In this conjunction, there may be employed a switch dedicated for interrupting the power supply to the actuator 10 in response to the failure signal F instead of the main switch 12.

FIG. 8 is a block diagram showing in detail a configuration of the simulator means 7A. As can be seen from the figure, the simulator means 7A is comprised of a hydraulic pressure arithmetic unit 71 for arithmetically determining a hydraulic brake pressure and generating the pseudo-brake-pressure signal M2 on the basis of the hydraulic pressure control signal C, a motor-vehicle model arithmetic unit 72 for generating the pseudo-wheel-speed signal M1, the pseudo-vehicle-deceleration signal M3 and the pseudo-slip ratio signal M4 and the pseudo-brake-pressure signal M2 by taking into consideration a road surface friction coefficient signal μ, a road surface characteristic arithmetic unit 73 for generating a road surface data type ID signal R indicating the type of road surface data and the road surface friction coefficient signal μ on the basis of the pseudo-slip ratio signal M4 and a road surface data changing command signal D, and an end decision part 74 for generating the road surface data changing command signal D and the test end signal E on the basis of the pseudo-wheel-speed signal M1.

Figure 9A:
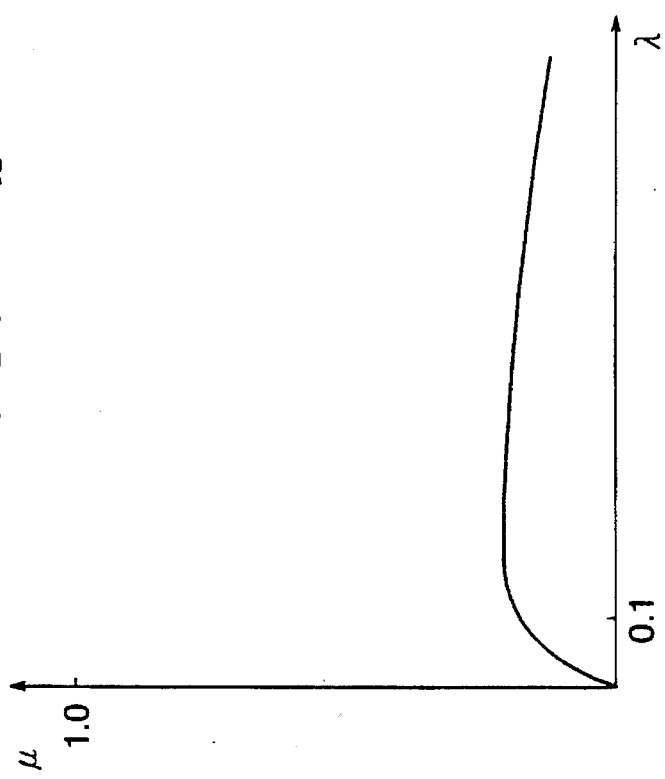
FIGS. 9A and 9B are views for graphically illustrating characteristics of road surface friction coefficient data stored in a road surface characteristic arithmetic unit of the simulator means.
Figure 9B:
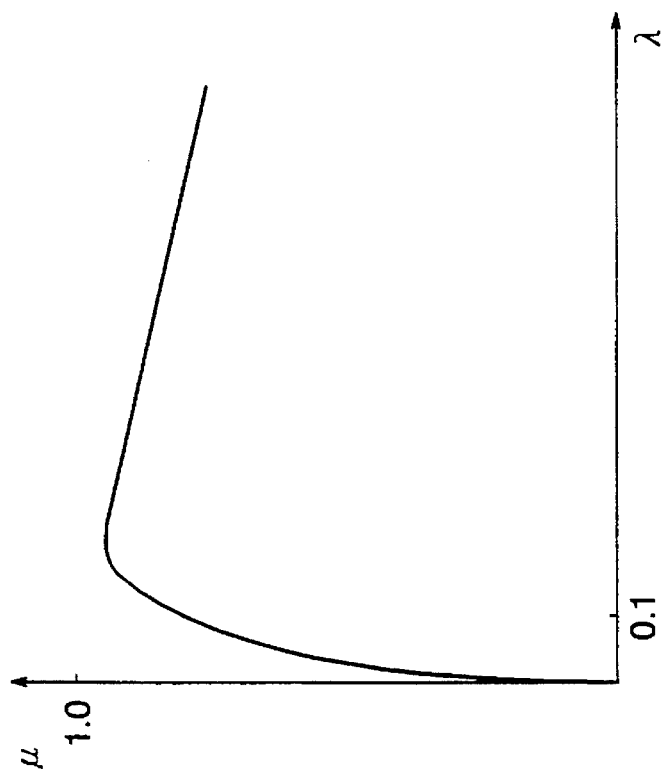

FIGS. 9A and 9B are views for graphically illustrating characteristics of road surface friction coefficient data stored in the road surface characteristic arithmetic unit 73. More specifically, the road surface characteristic arithmetic unit 73 stores therein (μ-λ) data (corresponding to the pseudo-slip ratio signal M4) for a H-μ type road having a high friction coefficient and a L-μ type road having a low friction coefficient and outputs the road surface friction coefficient signal μ in correspondence to the pseudo-slip ratio signal M4 (=λ) as inputted.

The motor-vehicle model arithmetic unit 72 determines an equation of motion for the motor vehicle of the model of concern on the basis of the pseudo-brake-pressure signal M2 and the road surface friction coefficient signal μ to thereby generate the pseudo-wheel-speed signal M1 and the pseudo-vehicle-deceleration signal M3. The end decision part 74 decides the end of failure event decision procedure performed by the simulator means 7A on the basis of the pseudo-wheel-speed signal M1 and the road-surface type ID signal R to thereby output an end signal.

Now, referring to FIGS. 8 and 9 together with FIGS. 6A and 7, operations of the anti-skid brake control system and the failure event detecting apparatus according to the instant embodiment will be described in detail. The wheel speed signal V derived from the outputs of the wheel speed sensors 1a to 1d is covered into binary data by means of the signal processing circuit 2 and inputted to the anti-skid brake control arithmetic means 6 via the input signal change-over means 5 incorporated in the main microcomputer 3A to undergo the selection processing, as described hereinbefore in conjunction with the first embodiment.

Thus, the actuator 10 is driven by the hydraulic pressure control signal C determined and generated by the anti-skid brake control arithmetic means 6, whereby magnitudes of slips of the individual wheels of the motor vehicle of concern are controlled so as to be optimal. As described hereinbefore, the slip control can be realized by holding constant the brake pressure, decreasing or increasing the same. Further, synchronism in the operation cycle between the main microcomputer 3A and the auxiliary microcomputer 4A is established via the synchronization path 19 so that both the microcomputers operate at a frequency of, for example, 10 MHz generated through cooperation of the clock oscillators 22 and 23 and the crystal elements 20 and 21, respectively.

When the conditions for generation of the test signal T described hereinbefore are met, the pseudo-wheel-speed signal M1 is generated by the simulator means 7A, starting from the initial state set previously. At the same time, the input signal change-over means 5 selects the pseudo-wheel-speed signal M1 to be inputted to the anti-skid brake control arithmetic means 6.

Thus, the anti-skid brake control arithmetic means 6 responds to the pseudo-wheel-speed signal M1 as inputted to thereby determine and generate the hydraulic pressure control signal C periodically at a predetermined time interval. In response to reception of the hydraulic pressure control signal C, the simulator means 7A arithmetically determines the pseudo-wheel-speed signal M1 to be used for the control in the succeeding cycle on the basis of the vehicle model data and the road surface condition data. At that time, the simulator means 7A determines the pseudo-brake-pressure signal M2 and the pseudo-vehicle-deceleration signal M3 as well.

The monitor means 8A monitors at least one of the pseudo-brake-pressure signal M2, the pseudo-vehicle-deceleration signal M3 and the pseudo-slip ratio signal M4 (pseudo-signal) outputted from the simulator means 7A as well as the hydraulic pressure control signal C to check the validity of the same.

Upon detection of occurrence of a failure event in the main microcomputer 3A, the monitor means 8A generates the failure signal F for thereby causing the alarm lamp 11 to be lit while opening the main switch 12 to thereby interrupt a power supply to the main microcomputer 3A from the power source Bat. To this end, an additional switch dedicated for interrupting the power supply to the actuator 10 may be provided.

In this way, according to the teachings of the invention incarnated in the instant (second) embodiment, the main microcomputer 3A processes time-serially the wheel speed signals V preconditioned in a normal operation mode of the motor vehicle, processing the pseudo-wheel-speed signal M1 for the test, respectively, while the auxiliary microcomputer 4A processes on a time-serial basis the hydraulic pressure control signal C outputted from the main microcomputer 3A in the same way.

Figure 10:
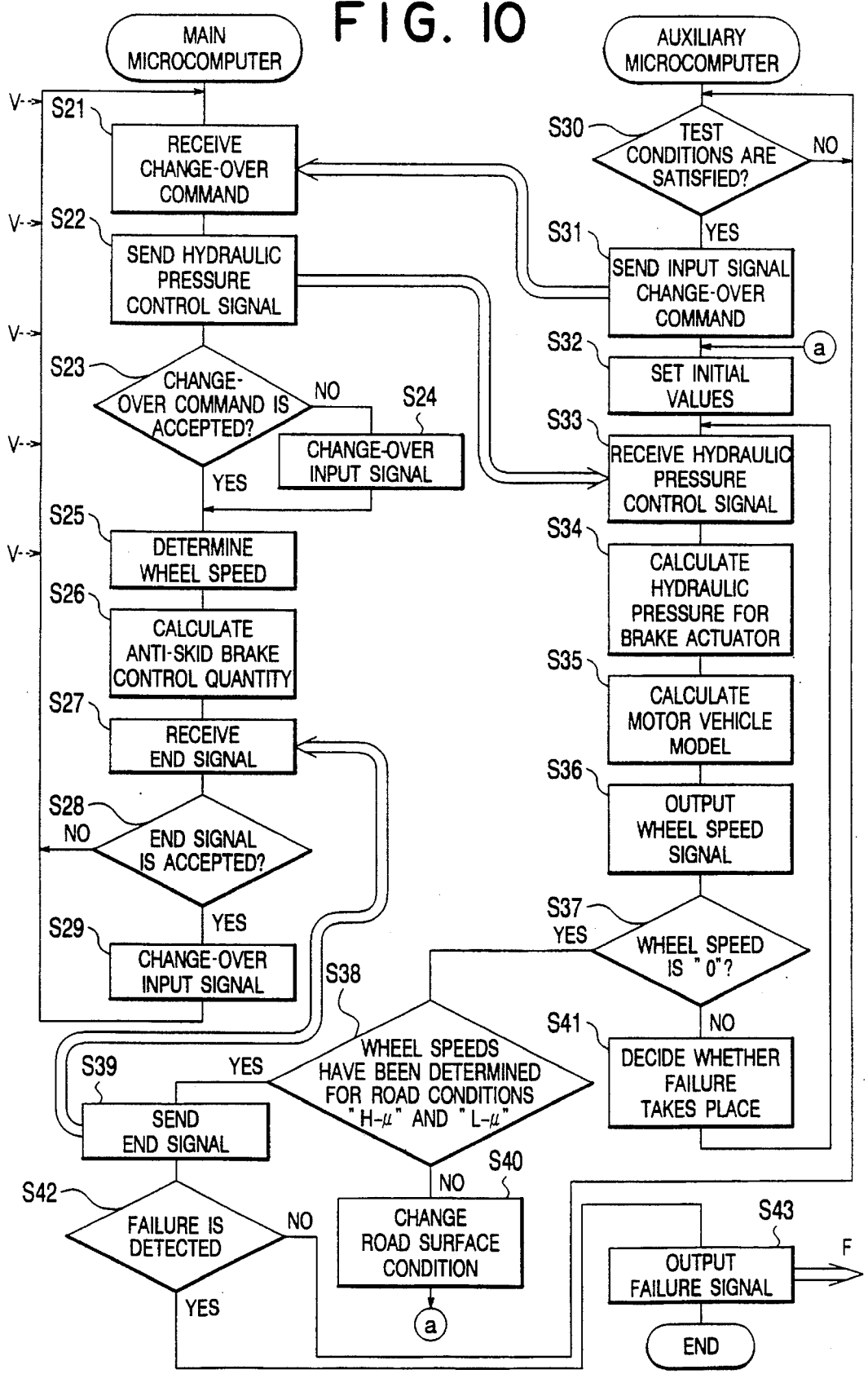
FIG. 10 illustrates, by way of example only, processings executed cyclically by the main microcomputer and the auxiliary microcomputer at a predetermined time interval.
Figure 11:
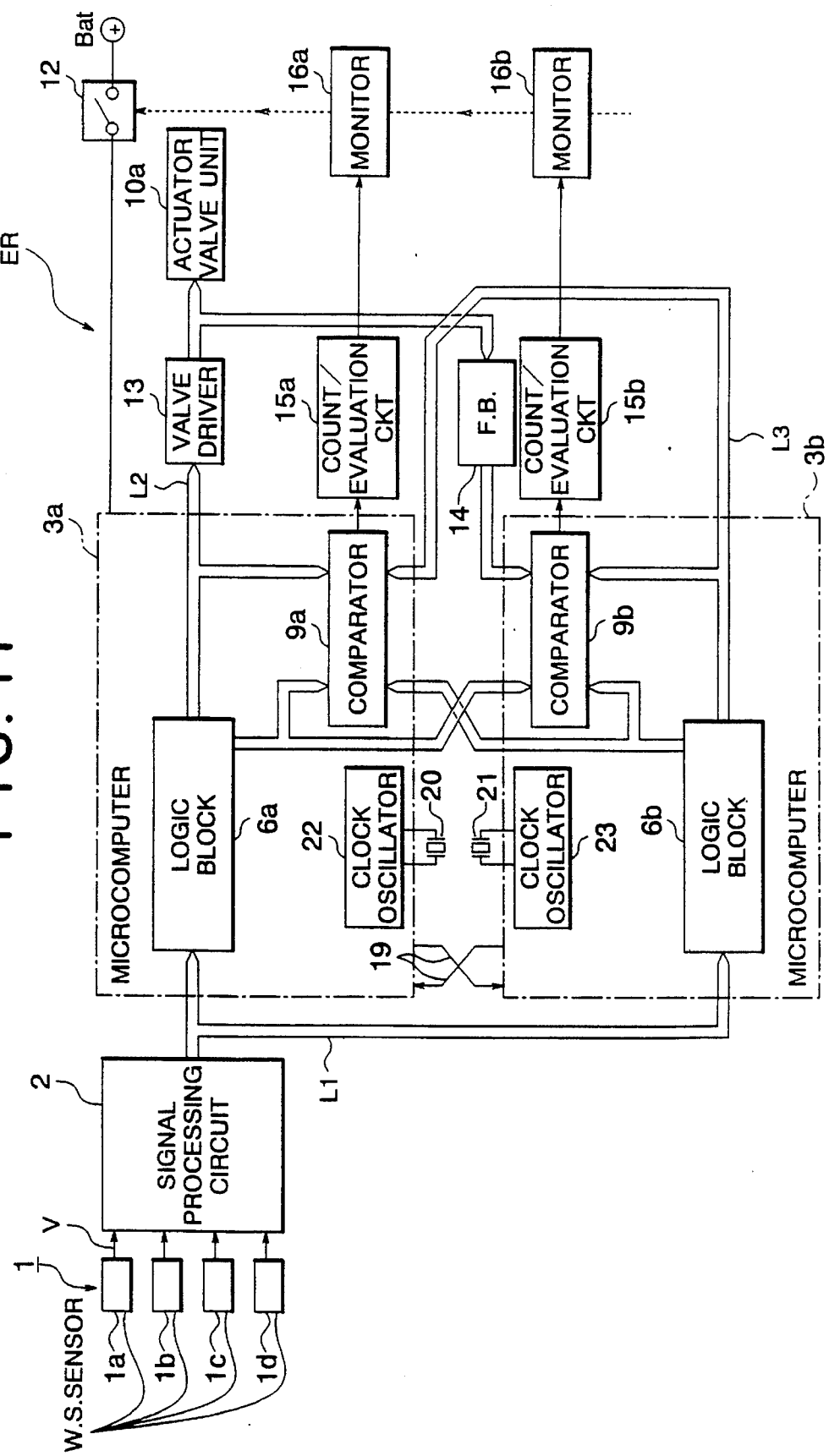
FIG. 11 is a block diagram showing a conventional anti-skid brake control system equipped with a failure detecting apparatus.

Next, referring to FIG. 10, description will turn to operation of the anti-skid brake control system and the failure detecting apparatus therefor according to the instant embodiment of the invention. Parenthetically, FIG. 10 illustrates, by way of example only, processings executed cyclically by at a predetermined time interval.

Upon starting of the cyclical routine illustrated in FIG. 10, it is decided in a step S30 by the auxiliary microcomputer 4A whether or not the conditions for the test mentioned hereinbefore (i.e., the conditions that the ignition switch is closed, the brake switch is opened and that the motor vehicle is stationary) are satisfied. When this decision step S30 results in affirmation (YES), the processing proceeds to a step S31 in which the input change-over command signal is issued to the input signal change-over means 5 incorporated in the main microcomputer 3A. Further, in a step S32, initial values for the vehicle model and the hydraulic system are set.

Subsequently, in a step S33, the hydraulic pressure control signal C issued from the main microcomputer 3A is received, as described hereinafter. Further, in a step S34, the brake pressure which meets the preset conditions is calculated. On the basis of the brake pressure value as determined, the processing for determining the motor vehicle model is started in a step S35.

As the road surface data to be used, there are prepared the (H-μ) and (L-μ) road surface characteristics, wherein the vehicle model is determined on the basis of one or both of these road surface characteristics. Subsequently, in a step S36, the pseudo-wheel-speed signal M1 as obtained in the step 35 is sent to the main microcomputer 3A.

Subsequently, in a succeeding decision step S37, it is decided whether or not the pseudo-wheel-speed signal M1 is at zero level. When the pseudo-wheel-speed signal M1 is zero (i.e., unless the result of the decision step S37 is negative), the processing resumes the step S33 after the failure decision step S41, whereupon the arithmetic routine including the steps S33 to S41 is repeated.

On the other hand, when decision is made in the step S37 that the pseudo-wheel-speed signal M1 is at the zero level (i.e., when the decision results in affirmation "YES"), the processing proceeds to a step S38 where it is decided whether both the road surface data (H-μ) and (L-μ) have been used. If it is decided that only one of the road surface data (H-μ) and (L-μ), the road surface data is changed over, whereupon the step S32 is restored. Subsequently, failure decision based on a sequence of simulating operations is repeated, starting from the initialization step S32.

On the other hand, when the decision step S38 results in affirmation (YES), this means that both of the road surface data mentioned above have been used. Accordingly, the test end signal E is sent to the main microcomputer 3A, whereupon the processing proceeds to the decision step S42 where the failure occurrence decision made in the step S41 is confirmed.

In contrast, when it is decided in the step S42 that no failure event occurs, the start step S30 is resumed, whereupon a sequence of the steps mentioned above is repetitively executed. On the other hand, when the decision step S42 results in affirmation (YES), indicating occurrence of a failure event, the failure signal F is issued in a step S42, whereupon execution of the program comes to an end.

Next, description will be directed to the processing steps S21 to S29 executed by the main microcomputer 3A. In a step S21, the input change-over signal issued from the auxiliary microcomputer 4A is received, being followed by a step S22 where the hydraulic pressure control signal C making appearance at that time point is sent to the auxiliary microcomputer 4A.

Subsequently, in a step S23, decision is made as to whether the input change-over signal has be received. When the result of this decision step S23 is affirmative (YES), the input signal change-over operation is performed in a step S24.

In this manner, when it is decided by the auxiliary microcomputer 4A that the test conditions are satisfied, the pseudo-wheel-speed signal M1 issued from the auxiliary microcomputer 4A is selected as the input signal. However, when the input change-over has first been effected, the pseudo-wheel-speed signal M1 outputted from the auxiliary microcomputer 4A is utilized in a succeeding cycle.

Subsequently, the conventional wheel speed determining operation is performed in a step S26, while the anti-brake control arithmetic operations are performed in a step S26 to thereby determine the hydraulic pressure control signal C in this cycle. Further, the test end signal E issued by the auxiliary microcomputer 4A is received in a step S27.

In succession, in a step S28, it is confirmed whether or not the test end signal E has been received. If the test end signal E has been received (i.e., when the step S28 results in affirmation "YES"), the input signal change-over operation is effected in a step S29, whereby the data (the wheel speed signal V) available from the wheel speed detection means 1 are selected.

As will be understood from the foregoing, the failure event can be detected on the basis of the hydraulic pressure control signal C corresponding to the pseudo-wheel-speed signal M1 or at least on the basis of one of the pseudo-wheel-speed signal M1, the pseudo-brake-pressure signal M2, the pseudo-vehicle-deceleration signal M3 and the pseudo-slip ratio signal M4. In this conjunction, it should be pointed out that the test signal for detection of a failure event is generated when the motor vehicle is stationary (i.e., not running). Thus, no obstacle is encountered in the normal operation of the motor vehicle or brake actuation control.

The hydraulic pressure control signal C and the pseudo-wheel-speed signal M1, the pseudo-brake-pressure signal M2, the pseudo-vehicle-deceleration signal M3 or the pseudo-slip ratio signal M4 determined and generated in the course of the test procedure reflect sequentially the results of real-time simulations in dependence on the hydraulic pressure control signal C by the simulator means 7A. Thus, it goes without saying that the failure event detection can be made on the basis of any one of the signals mentioned above.

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. By way of example, although it has been described that a microcomputer is used for detecting a failure event in the microcomputer dedicated for the anti-skid brake control, any other type of hardware or software capable of detecting the failure event may be employed, substantially to the same effect. Accordingly, the phrase "auxiliary microcomputer" used herein should not be interpreted in the strict sense. Thus, all suitable modifications and equivalents may be resorted to, falling within the scope of the invention.

We claim:

1. An apparatus for detecting occurrence of a failure in an anti-skid brake control system of a motor vehicle, comprising:

a main microcomputer for generating a hydraulic pressure control signal for controlling actuator means for controlling a braking operation applied to wheels of the motor vehicle; and an auxiliary microcomputer for detecting occurrence of a failure in said main microcomputer on the basis of said hydraulic pressure control signal;

said main microcomputer including:
test signal generating means for generating a test signal; and
anti-skid brake control arithmetic means, responsive to one of at least one wheel speed signal and said test signal, for generating said hydraulic pressure control signal;

said auxiliary microcomputer including:
hydraulic pressure control signal monitoring means for monitoring said hydraulic pressure control signal generated in response to said test signal, and for determining occurrence of a failure in said main microcomputer when said hydraulic pressure control signal does not coincide with a predetermined value corresponding to said test signal, wherein said hydraulic pressure control monitoring means generates a failure signal when a failure is detected.

2. The failure detecting apparatus for an anti-skid brake control system according to claim 1, wherein said test signal generating means generates said test signal when an ignition switch of said motor vehicle is closed with a brake switch thereof being opened and when said wheel speed signal is zero.

3. The failure detecting apparatus for an anti-skid brake control system according to claim 1, further comprising means for interrupting power supply to said main microcomputer in response to said failure signal.

4. An apparatus for detecting occurrence of a failure in an anti-skid brake control system of a motor vehicle, comprising:

a main microcomputer for generating a hydraulic pressure control signal for controlling actuator means which controls a braking operation applied to wheels of the motor vehicle; and an auxiliary microcomputer for detecting occurrence of a failure in said main microcomputer on the basis of said hydraulic pressure control signal;

said main microcomputer including:
   anti-skid braking control arithmetic means for generating said hydraulic pressure control signal;
said auxiliary microcomputer including:
   test signal generating means for generating a test signal; and
   hydraulic pressure control signal monitoring means for monitoring said hydraulic pressure control signal generated in response to said test signal and for determining occurrence of a failure in said main microcomputer when said hydraulic pressure control signal is not coincident with a predetermined value corresponding to said test signal, wherein said hydraulic pressure control signal monitoring means generates a failure signal when said failure is detected.

5. The failure detecting apparatus for an anti-skid brake control system according to claim 4,
   wherein said test signal generating means generates said test signal when an ignition switch of said motor vehicle is closed with a brake switch thereof being opened and when said wheel speed signal is zero.

6. The failure detecting apparatus for an anti-skid brake control system according to claim 4,
   further comprising means for interrupting power supply to said main microcomputer in response to said failure signal.

7. An apparatus for detecting occurrence of a failure in an anti-skid brake control system of a motor vehicle, comprising:
   a main microcomputer for generating a hydraulic pressure control signal for controlling actuator means which controls a braking operation applied to wheels of the motor vehicle; and
   an auxiliary microcomputer for detecting occurrence of a failure in said main microcomputer;
   said main microcomputer including:
      simulator means for generating, in response to said hydraulic pressure control signal, a variety of pseudo-signals for simulating said anti-skid brake control system as well as model type of said motor vehicle, said pseudo-signal including a pseudo wheel speed signal; and
      anti-skid brake control arithmetic means for generating said hydraulic pressure control signal in response to one of at least one wheel speed signal and said pseudo wheel speed signal;
   said auxiliary microcomputer including:
      monitor means for monitoring said hydraulic pressure control signal corresponding to one of said pseudo-wheel-speed signal and at least one of said pseudo-signals and for detecting occurrence of a failure in said main microcomputer when said hydraulic pressure control signal does not coincide with a predetermined value corresponding to one of said pseudo wheel speed signal and at least one of said pseudo signals.

8. The failure detecting apparatus for an anti-skid brake control system according to claim 7,
   wherein said simulator means generates said pseudo-signals when an ignition switch of said motor vehicle is closed with a brake switch thereof being opened and when said wheel speed signal is zero.

9. An apparatus for detecting occurrence of a failure in an anti-skid brake control system of a motor vehicle, comprising:
   a main microcomputer for generating a hydraulic pressure control signal for controlling actuator means which control a braking operation applied to wheels of the motor vehicle; and
   an auxiliary microcomputer for detecting occurrence of a failure in said main microcomputer;
   said auxiliary microcomputer including:
      simulator means for generating, in response to said hydraulic pressure control signal, a variety of pseudo-signals for simulating said anti-skid brake control system as well as model type of said motor vehicle, said pseudo-signals including a pseudo wheel speed signal;
   said main microcomputer including:
      anti-skid brake control arithmetic means for generating said hydraulic pressure control signal in response to one of a wheel speed signal and said pseudo-wheel-speed signal;
   wherein said auxiliary microcomputer further includes monitor means for monitoring said hydraulic pressure control signal generated in response to one of said pseudo wheel speed signal and at least one of said pseudo-signals and for detecting occurrence of a failure in said main microcomputer when said hydraulic pressure control signal does not coincide with a predetermined value corresponding to one of said pseudo wheel speed signal and at least one of said pseudo signals.

10. The failure detecting apparatus for an anti-skid brake control system according to claim 9,
   wherein said simulator means generates said pseudo-signals when an ignition switch of said motor vehicle is closed with a brake switch thereof opened and when said wheel speed signal is zero.

* * * * *